US009126707B2

(12) United States Patent
Persson

(10) Patent No.: US 9,126,707 B2
(45) Date of Patent: Sep. 8, 2015

(54) SEALING UNIT AND A SUSPENSION FOR A SEALING JAW UTILIZED IN SUCH SEALING UNIT

(75) Inventor: Richard Persson, Häljarp (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 123 days.

(21) Appl. No.: 14/115,836

(22) PCT Filed: Jun. 13, 2012

(86) PCT No.: PCT/SE2012/050635
§ 371 (c)(1),
(2), (4) Date: Nov. 5, 2013

(87) PCT Pub. No.: WO2012/173556
PCT Pub. Date: Dec. 20, 2012

(65) Prior Publication Data
US 2014/0083050 A1    Mar. 27, 2014

(30) Foreign Application Priority Data

Jun. 15, 2011 (SE) ........................................ 1150539

(51) Int. Cl.
*B32B 37/00* (2006.01)
*B65B 51/30* (2006.01)
(Continued)

(52) U.S. Cl.
CPC ................ *B65B 51/30* (2013.01); *B29C 65/02* (2013.01); *B29C 66/1122* (2013.01); *B29C 66/43121* (2013.01); *B29C 66/7234* (2013.01); *B29C 66/8161* (2013.01); *B29C 66/8167* (2013.01); *B29C 66/81427* (2013.01); *B29C 66/8221* (2013.01); *B29C 66/8227* (2013.01);
(Continued)

(58) Field of Classification Search
CPC .. B65B 51/14; B65B 51/30; B29C 66/43121; B29C 66/8161; B29C 66/82263; B29C 66/8227; B29C 66/8246; B29C 66/849; B29C 66/1122; B29C 65/02
USPC .............. 156/228, 555, 580, 581, 582, 583.1; 53/373.7; 29/402.01
See application file for complete search history.

(56) References Cited

U.S. PATENT DOCUMENTS 4,947,618 A    8/1990   Schneider et al.
5,966,897 A    10/1999  Kirka et al.
(Continued)

FOREIGN PATENT DOCUMENTS

EP    0 959 007 A1    11/1999
WO    WO 96/09970 A1    4/1996
(Continued)

OTHER PUBLICATIONS

International Search Report (PCT/ISA/210) mailed on Oct. 29, 2012, by the Swedish Patent Office as the International Searching Authority for International Application No. PCT/SE2012/050635.

*Primary Examiner* — James Sells
(74) *Attorney, Agent, or Firm* — Buchanan Ingersoll & Rooney PC

(57) ABSTRACT

A sealing unit for sealing and forming a packaging container is disclosed. The sealing unit operates on a principle that the motion of a pair of opposing sealing jaws is controlled by a cam-cam follower interaction combined with the action of a servomotor driving a cam wheel.

12 Claims, 4 Drawing Sheets

(51) Int. Cl.
 B29C 65/00 (2006.01)
 B29C 65/02 (2006.01)
 B65B 51/14 (2006.01)
 B29L 31/00 (2006.01)
 B29C 65/36 (2006.01)
 B65B 51/22 (2006.01)

(52) U.S. Cl.
 CPC ....... B29C66/8246 (2013.01); B29C 66/82263 (2013.01); B29C 66/83241 (2013.01); B29C 66/849 (2013.01); B65B 51/14 (2013.01); B65B 51/144 (2013.01); B29C 65/3656 (2013.01); B29C 65/3668 (2013.01); B29C 65/3676 (2013.01); B29C 66/72321 (2013.01); B29C 66/81457 (2013.01); B29L 2031/712 (2013.01); B31B 2201/603 (2013.01); B65B 51/227 (2013.01); Y10T 29/49718 (2015.01)

(56) References Cited

U.S. PATENT DOCUMENTS

| | | | | |
|---|---|---|---|---|
| 6,138,442 | A * | 10/2000 | Howard et al. | 53/477 |
| 6,186,014 | B1 | 2/2001 | Kato | |
| 7,211,169 | B2 * | 5/2007 | Noble | 156/583.1 |
| 2005/0272584 | A1 | 12/2005 | Zetterstrom et al. | |
| 2008/0276576 | A1 | 11/2008 | Anderson | |

FOREIGN PATENT DOCUMENTS

| | | |
|---|---|---|
| WO | 00/21834 A1 | 4/2000 |
| WO | 2004/054879 A1 | 7/2004 |
| WO | WO 2004/054790 A1 | 7/2004 |

* cited by examiner

SEALING UNIT AND A SUSPENSION FOR A SEALING JAW UTILIZED IN SUCH SEALING UNIT

TECHNICAL FIELD

The present invention relates to a sealing unit for forming and sealing an open end of a tubular packaging container.

BACKGROUND

Within the field of packaging of pourable products, and in particular of pourable foods, there are various kinds of packaging containers used. The packaging containers vary in package shape, packaging material, etc. resulting in variation in the method used for filling of the packaging container and sealing of the packaging container. The present invention may preferably be used for a packaging container made from a packaging laminate comprising a core layer and several surrounding barrier layers.

When sealing an end of a tubular packaging container use is often made of sealing jaws, clamping and heating the end of the packaging container in order to seal one end thereof. The basic technique is well-known and will not be discussed in any more detail here. For the purposes of the present invention, however it should be mentioned that "tubular" includes packages having a cross section other than circular, such as quadratic, rectangular, hexagonal, oval, etc, i.e. a packaging container being formed by bonding two opposite edges thereof to form a sleeve.

The sealing of an end of a packaging container is a complex procedure. The end should be sealed, formed and folded according to a preset pattern, and fixed to the desired shape (usually flat in the case of the bottom of a container). The different operations are not necessarily performed in the order stated above; when sealing the final open end of a container, the sealing should preferably be performed late, since a surplus of air will be caught inside the container if sealed too early. This poses no problem when the first end of the container is sealed, formed and folded.

The stated operations are not necessarily performed by the same tool, either. Generally, the sealing and initial forming and folding are performed by one tool, and the final folding and fixing is accomplished by another tool, or arrangement of tools.

The tool for sealing and initial forming and folding may comprise two opposing sealing jaws, clamping the open end of the tubular packaging container and providing energy for the accomplishment of sealing. On their way from an open position to a clamping position the two opposing sealing jaws may follow a path of movement such that they initiate the forming and folding, and after clamping and sealing the packaging container, they may continue their movement to continue the forming and folding. Even if the path as such may be simple enough, the mechanics needed in order to make the sealing jaws follow such path will be more complex, in particular since factors such as reliability, repeatability, and durability are important and since price is always an issue. Examples of prior art solutions may be found in WO2004054790, by the present applicant, and US2008/0276576 also by the present applicant.

The present invention aims at providing a bottom form and sealing unit which is easy to operate, durable and reliable.

SUMMARY

For achieving the stated objectives the present invention provides a form and sealing unit for sealing and forming an open end of a packaging container, which comprises a pair of sealing jaws arranged on a pair of tongs controlled by a first and a second cam arrangement. Each cam arrangement comprises a cam track, a cam follower and a rigid power-transfer arrangement, wherein both cam tracks are arranged on a single cam wheel and arranged to move the first and second cam followers in opposite directions. The sealing unit is characterized in that a servomotor is arranged to drive the cam wheel intermittently between an open position, for the sealing jaws, and a closed position, for the sealing jaws.

As will be explained in the detailed description the combination of a cam arrangement and a servomotor enables a construction facilitating the achievement of the stated objectives.

In one or more embodiments each of the two sealing jaws is arranged on a proximal end of the tong element having a first pivot point at its distal end, the distance between the first pivot points of the first and the second tong element being constant.

In one or several embodiments each of the two tong elements share a common first pivot point in the form of a first pivot axis, and wherein the pivot axis is rigidly coupled to the first cam arrangement.

The second cam arrangement may extend to a second pivot axis from which two links extend, each link coupling to one tong element in a coupling point being located between the distal end and the proximal end, such that relative movement between the first and the second pivot axis results in alteration of an inclination of the links and pivotal movement of the tongs in an opening or closing direction.

The first cam follower may connect to the first pivot point via a first axle, the second cam follower connects to the second pivot point via a second axle, wherein the first and the second axle extends along the same axis.

In one or more embodiments the second axle may be arranged inside the first axle, which is conveniently achieved by said second axle comprising a hollow cylinder.

In order to increase controllability, movement of the second cam follower may control a vertical position of the tongs and jaws, and movement of the first cam follower relative to the second cam follower may control the pivotal position of the tongs. Isolating the movement facilitates control and in particular the realization of modifications in the pattern of movement of the sealing jaws.

In one or more embodiments the first and second cam follower connects to the first and second axle via a first and second shaft, the first and second shaft extending past a connection point between the first and second axle and the first and second shaft, and wherein the end of each shaft remote to each cam follower comprises a guide means.

An important issue is that the device of the present invention provides self-supporting system where forces generated during operation of the device are absorbed within the physical constraints of the device. This simplifies the incorporation of the present device into an existing machine significantly, since the consideration that has to be taken, e.g. in relation to the surrounding construction is minimized. It further simplifies the calibration of the device, since this may be performed in an isolated process.

DETAILED DESCRIPTION

Figure 1:
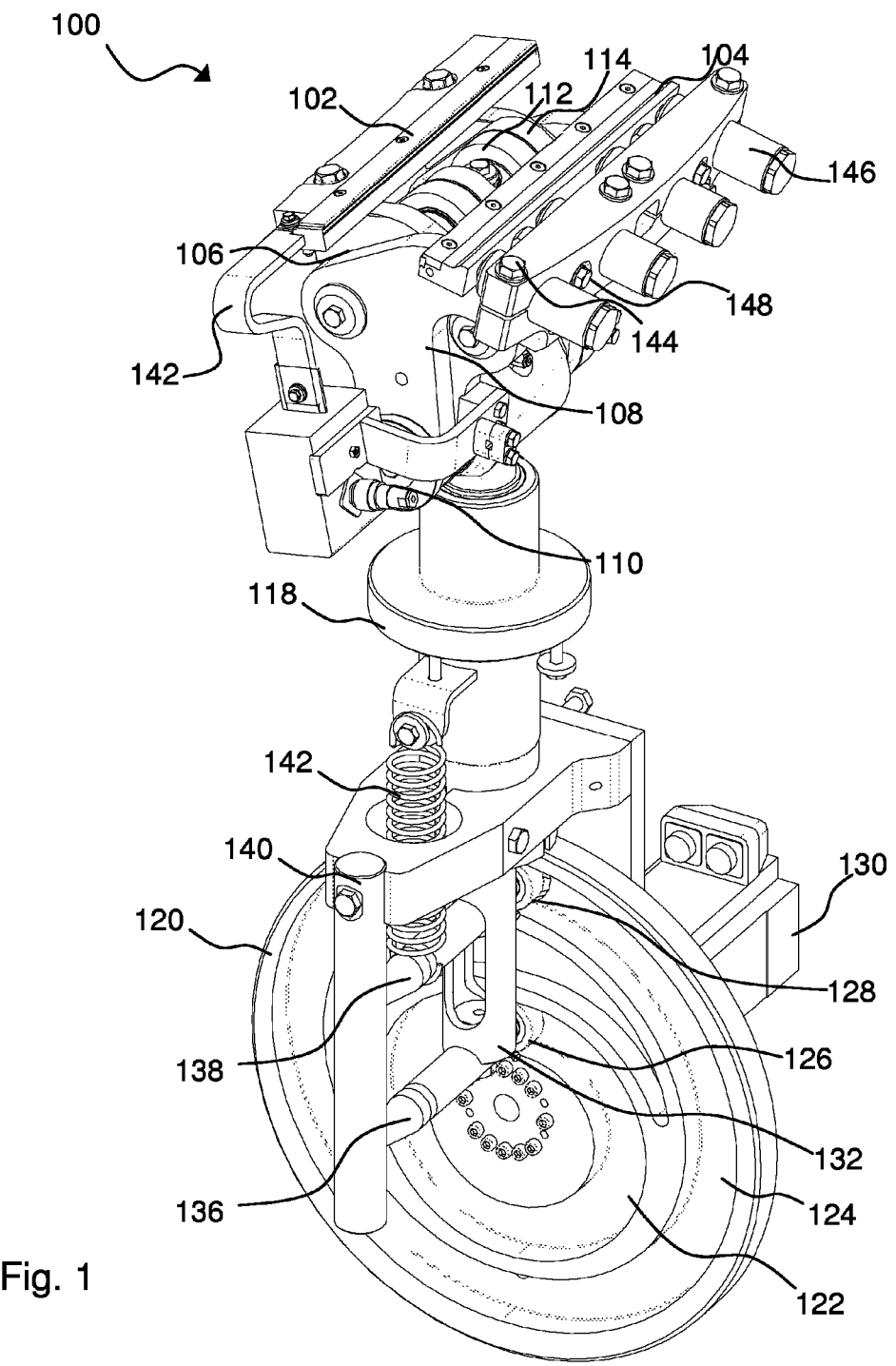
FIG. 1 is a perspective view of a form and sealing unit according to a first embodiment of the present invention.

The present invention will be discussed starting from FIG. 1, which illustrates a form and sealing unit 100 according to a first embodiment of the present invention. Starting from the top, the function of the form and sealing unit 100 is to move the sealing jaws 102, 104 between an open and a closed position. The open position allows for a new package container to be inserted between the sealing jaws and the closed position allows for one end of a package container to be closed and sealed. The purpose and function of the sealing jaws will not be discussed in detail here, since the purpose is obvious and the basic function may be considered well known for the skilled person. The path chosen by the sealing jaws on their way from the open to the closed position will affect their interaction with the package container, and the path is a parameter to account for. This will be discussed later on in the detailed description.

Moving on, each sealing jaw 102, 104 is attached to a proximal end of a corresponding tong 106, 108. At least one of the sealing jaws 104 is movably attached to the corresponding tong 108, such that the distance between the sealing jaws 102, 104 may be varied. The main purpose for wanting to vary the distance between sealing jaws is to account for specific thickness of the packaging material by adjusting the clearance between the sealing jaws. The opposing, distal end of each tong 106, 108 is coupled to a first pivot axis 110, which in the present embodiment is a common pivot axis for both tongs 106, 108.

Figure 3:
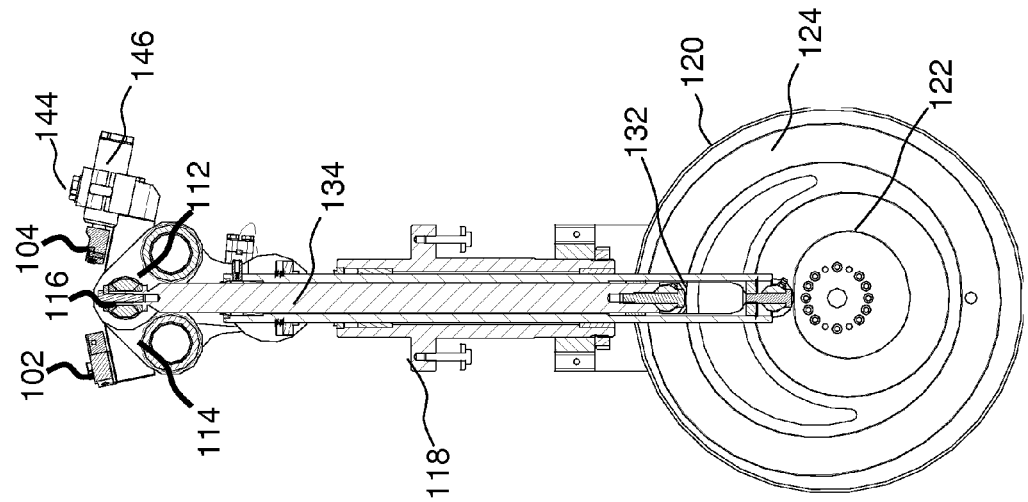
FIG. 3 is a frontal cross sectional view of a form and sealing unit according to the first embodiment.
Figure 2:
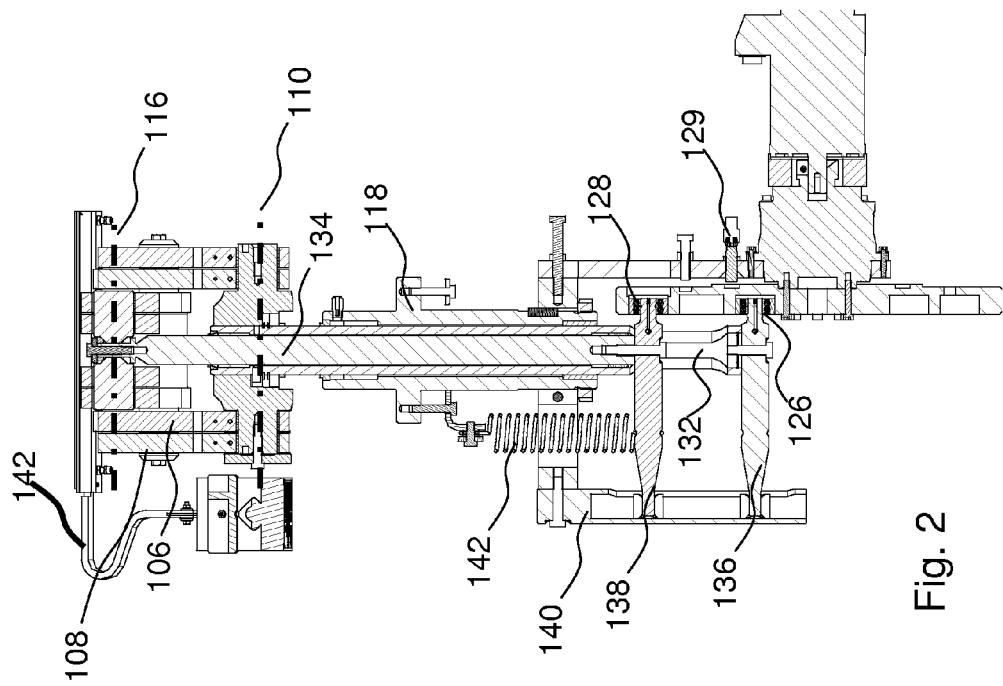
FIG. 2 is a cross sectional view from one side of a form and sealing unit according to the first embodiment.
Figure 4:
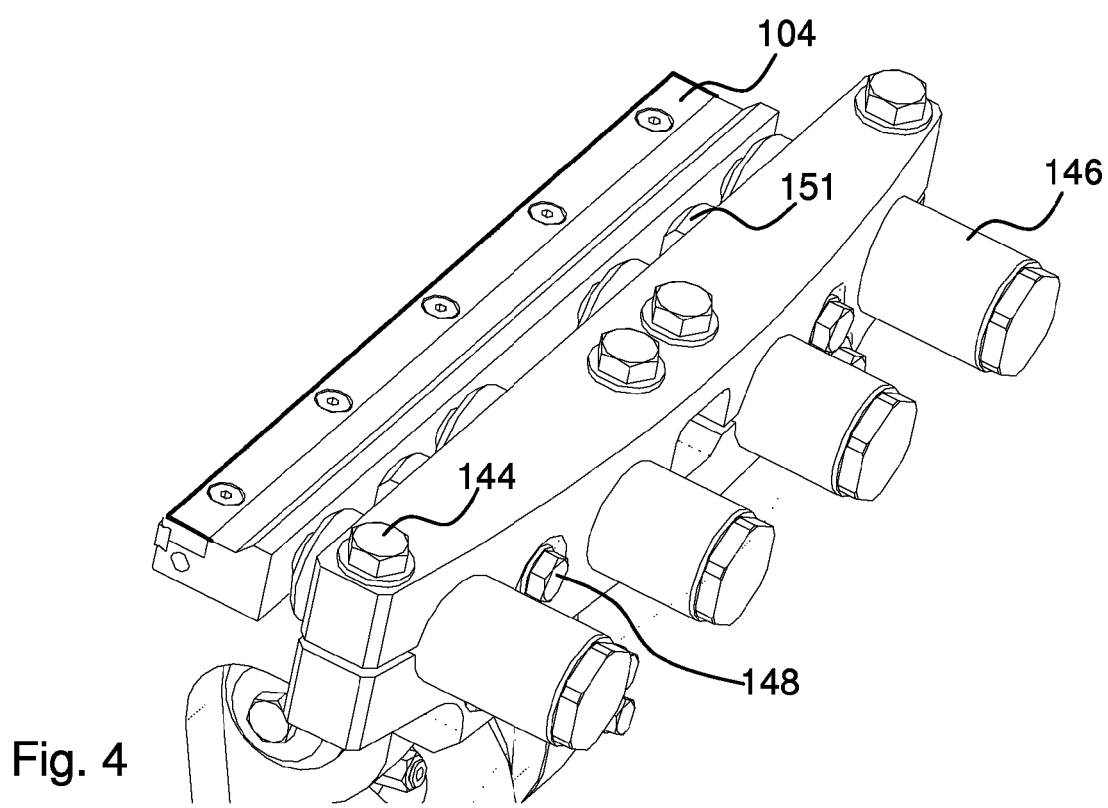
FIG. 4 is a perspective view showing details of a sealing jaw previously shown in FIG. 1

Details of the sealing jaw 104 are more readily appreciated studying FIG. 4, and for a better understanding reference is also made to FIGS. 2 and 3.

In a position between the sealing jaws 102, 104 and the first pivot axis 110 links 112, 114 (partly obscured in FIG. 1) extend from the tongs 106, 108 to a common second pivot axis 116 (not shown in FIG. 1). The links 112, 114 are allowed to pivot at both their coupling points, and in the present embodiment each tong is associated with two links. It is readily understood that by altering the relative distance between the first and the second pivot axis, the inclination of each link will vary, and by that the distance between the sealing jaws 102, 104. The device is preferably tuned such that the position in which the links are directed 180° degrees relative to each other is included in an operational cycle, corresponding to the position in which the sealing jaws are fully closed (or at least cannot be brought any closer to each other).

A socket 118 acts as the framework for the unit 100, and components being rigidly connected to the socket will form a part of the framework. It should be obvious for the skilled person reading this description that all forces generated by the system will be absorbed inside the system too, since the socket 118 will act as a rigid anchor. If the system operates in such a way that inertial forces become an issue it will have to be balanced properly. What has been described above is located on one side of the socket 118. The other side of the socket 118 comprises the drive section, including a driven cam wheel 120 having two cam tracks 122, 124 guiding two cam followers 126, 128. The cam wheel 120 is driven by a servomotor 130. Using a servomotor 130 introduces a great advantage as compared to known systems. The advantage lies in that "hold times" may be absorbed by the servomotor 130 instead of by the shape of the cam tracks 122, 124.

Examples of hold times include the period during which the sealing jaws are in their opened and closed position respectively. The duration of the closed position (which may be referred to as "sealing time") will vary with many parameters, such as material properties, properties of the sealing agent, production rate, etc. Being able to divide the moving cycle of the sealing jaws into to operational portions (moving and standing still) and being able to control the different portions by different means (shape of the cam track and stopping the servomotor) is a considerable advantage. One reason is that it simplifies tuning of the device to several different packages (in regard of size and material). The cam tracks 122, 124 will control the path of the sealing jaws 102, 104, and the same path (and thus the same cam wheel) may be utilized for several packages with different size. If a servomotor was not used, the cam tracks would have had to account for the hold times too by having long segments where the track extended at constant radius from the rotational centre of the cam wheel. This in turn would result in less track length available for actual movement of the cam follower, which in turn results in steeper contact angles and greater forces on the system, effectively reducing durability. One solution to this problem would be to increase the size of the cam wheel, yet this would increase the mass and volume of the system in an undesired way.

Further, the inventive arrangement isolates the control of forming and sealing from the overall machine speed, e.g. from the intermittent forwarding of packaging containers or packaging material. In fully mechanical system this is generally not possible and the advantage of being able to use optimized timing for the forming and sealing at all times is considerable. In normal operation the forming and sealing will be optimized for maximum machine speed, and if the machine operates at a slower pace it will not cause a problem.

The motion of the cam followers 126, 128 has to be transferred to the corresponding first and second pivot axis, 110 and 116, respectively. A first and a second axle 132, 134 (the latter is not visible in the view of FIG. 1) respectively are utilized for this purpose. The first axle 132 comprises a hollow cylinder inside which the second axle 134 extends. The coaxial arrangement is excellent for avoiding generation of torsional forces and it also adds to the compactness of the arrangement. The cam followers 126, 128 are coupled to their corresponding axle 132, 134 by means of one shaft 136, 138 each. In the present embodiment each shaft 136, 138 extends beyond the axle 132, 134. At the remote end of each shaft 136, 138 guide means may be arranged to further stabilize the arrangement. In the present embodiment the remote end of each shaft extends into a longitudinal slit provided in a cylinder 140 which is rigidly connected to a portion of the socket 118.

The shaft 138 corresponding to the second cam follower 128 may be biased upwards, towards the second pivot axis 116. In this way it may be ensured that the second cam follower 128 engages the outer perimeter of the second cam track 124 at all times, instead of wandering between the inner and the outer perimeter, and in this way the tolerances in the unit are reduced. More importantly, a switch from the outer perimeter to the inner perimeter will result in that the direction of rotation of the cam follower 128 reverses. The sudden deceleration and acceleration will rapidly induce wear of the cam follower 128 and of the cam track 124. In the present embodiment the biasing effect is accomplished by means of a regular coil spring 142. The coil spring 140 connects the second shaft 138 to a fix point of the socket 118 and exerts a pulling force between the two. In another embodiment the shaft may be biased in another direction, such as the direct opposite direction. The first shaft may also be biased upwardly or downwardly.

A sensor 129 may also be arranged on the socket 118. The purpose of the sensor 129 is to provide information regarding the position of the cam wheel (and thereby of the sealing jaws). One reason for this may be that as the cam wheel is to assume a starting position, it should always reach that starting position by moving in a direction such that the sealing jaws never move upwards, in a closing direction. This means that if the sealing jaws are positioned in an opening stroke the cam wheel should rotate in the normal operation direction in order to reach the starting position. If the sealing jaws on the other hand are located in a closing stroke, the cam wheel should be rotated opposite to the operation direction. This is to avoid that the sealing jaws interfere with equipment above the sealing jaws. In the present embodiment this has been accomplished by the sensor providing a signal during one of the two strokes (not important which one) and not providing a signal during the other stroke. To be more specific a peripheral groove is arranged on one half of the circumference of the cam wheel and not the other, and the sensor has a sensing pin (basically a switch) biased towards the bottom of the groove. The skilled person realizes that there are many other ways of accomplishing the desired information, and that the necessary drive is readily accomplished with the servomotor.

Returning to the sealing jaws 102, 104 and their suspension the reader may benefit from knowing that in the present embodiment the tongs 106, 108 are essentially identical and two tongs are used for each sealing jaw. One of the sealing jaws 102 comprises an inductor, which is used to heat the packaging material clamped between the first sealing jaw 102 and the second sealing jaw 104 during operation. The second sealing jaw 104 acts as an anvil for the inductor. Generally, energy has to be transferred from the sealing unit to the packaging material in order to generate heat and accomplish sealing, yet in some instances the application of a clamping force suffices. A cable or busbar 142 is used to transfer power to the inductor used for heating. In situations where heating is desired, inductive heating is one of several alternatives, and thus the present invention should not be construed as limited to this specific embodiment. The second sealing jaw 104 is attached to the corresponding tong 108 in such a way that the distance between the sealing jaws may be varied. In this way the arrangement may be adapted to various thicknesses of the packaging material in a simple and straightforward manner.

After loosening bolts 144 of a two part holder 160, cylinders 146 may be slid back and forth, which effectively will alter the distance between the sealing jaws in their closed position. The cylinders 146 have a slightly more complex construction than what is obvious from FIG. 1. They offer a resilient suspension for the sealing jaw 104, and an internal variable spring means (inside each cylinder 146) enables a variable sealing force to be applied to a packaging material clamped between the sealing jaws. The suspension also comprises further spring means 151 arranged to push the sealing jaw 104 away from the holder. The force applied by the spring means 151 (by aid of the spring arranged therein) may be varied and set to about half the desired sealing force, and the spring means 151 are particularly useful when calibrating the sealing jaws, and the whole arrangement, the procedure which will be described in the following paragraph. It should be noted that only one bolt 144, cylinder 146 and spring means 151 has been given a reference numeral in FIG. 1, yet this is only to increase the readability of FIG. 1 and should not be used as an indication for the actual number of components.

Figure 5:
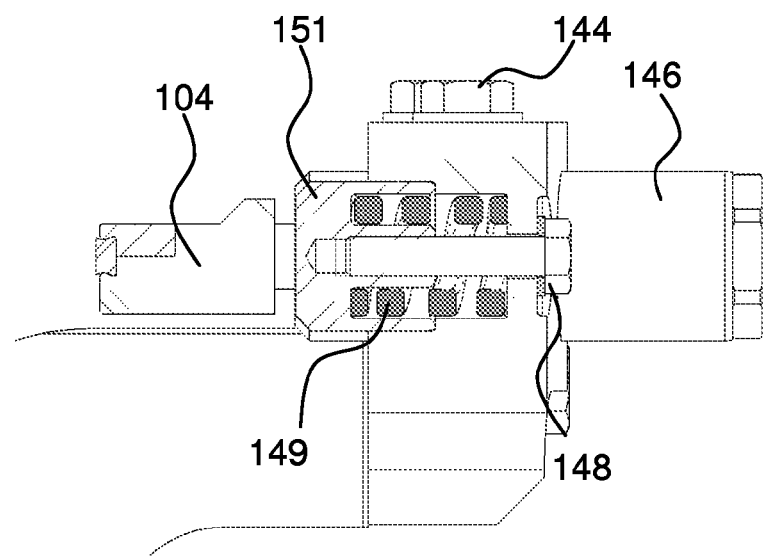
FIGS. 5 and 6 are cross sectional views of two parts of a sealing-jaw suspension according to a first embodiment.
Figure 6:
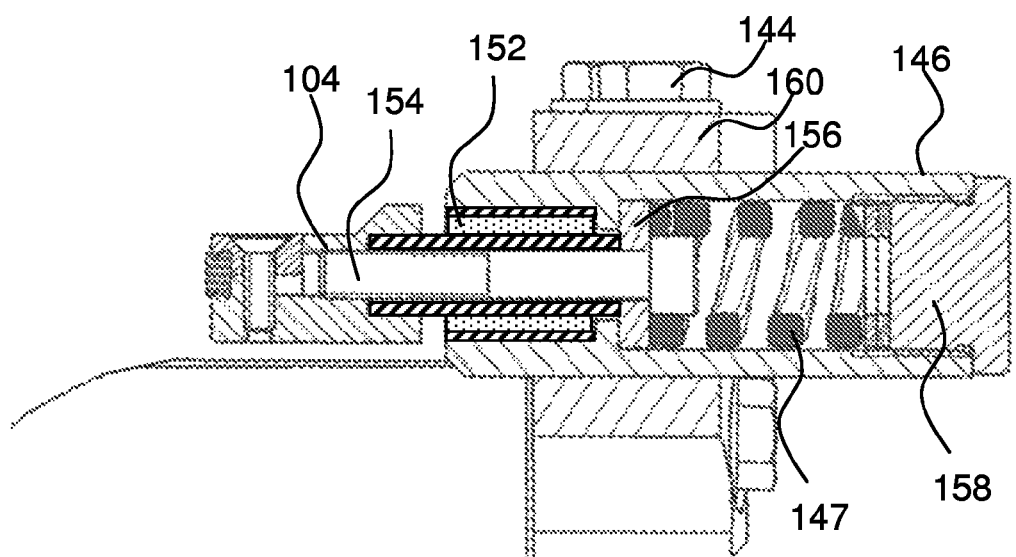

From FIG. 1 it is possible to deduce that there are four bolts 144, four cylinders 146 and two spring means 151 in the arrangement of the present embodiment. The skilled person realizes that it is the desired function of the components that is the issue rather than the type or number of the actual components. The effect of the further spring means 151 is controlled by operation of the screw 148, which will be described in more detail in relation to FIGS. 5 and 6. FIG. 5 is a cross section illustrating the further spring means 151 and FIG. 6 is a cross section illustrating the cylinder 146.

The calibration of the above system is particularly simple, and it does not have to be performed in the order to be stated below even if it may be the most straightforward manner. The user simply transfers the sealing jaws to their fully closed position having the desired amount of packaging material clamped between the sealing jaws, preferably being less than the amount of packaging material located there during actual operation of the system. The arrangement may then be locked in this position, e.g. by physical locking of the cam wheel. After loosening the bolts 144 the sealing jaw 104 will be biased towards the sealing jaw 102 with about half the desired sealing force, provided by the further spring means 151, clamping the packaging material therebetween. At this point the bolts 144 are tightened again, and the arrangement has been calibrated. In some embodiments the biasing force from the spring 149 arranged in the spring means 151 is not desired during operation, in which case it is only activated during calibration of the sealing jaws. The sealing arrangement comprises a number of joints, and each joint will result in some amount of play which will affect the tolerances. The force generated by the spring means 151 during calibration will effectively force the total play in the system towards one extreme, and in this way the tolerances of the arrangement when packaging material is clamped between the sealing jaws are minimized.

A rubber bushing 152 may be arranged between the sealing jaw 104 and each cylinder 146 as part of the suspension. The rubber bushing 152 may easily be designed by a suitable choice of shape and material such that they will not affect the sealing force, at least not to a significant degree, while still acting as a protective safety measure for the arrangement. In the present embodiment the rubber bushing comprises rubber vulcanized between two steel cylinders. A piston 154 is arrange to transfer forces between a main spring 149 and the sealing jaw 154. If there is a jam in the sealing unit a possible effect may be that the amount of packaging material between the sealing jaws is doubled or more. The packaging material may also be shifted towards one end of the sealing jaw, causing an uneven load. Such unwanted displacement of the sealing jaw 104 may result in failure of the sealing jaws, their suspension and undesired forces may be transferred through the arrangement and cause failure of the whole arrangement. The rubber bushings will however absorb the forces and displacement within foreseeable limits, which will spare integrity of the arrangement. As shown in the embodiment of FIG. 6 the rubber bushings may consist of rubber vulcanized between two concentrically arranged (metal) cylinders.

FIGS. 2 and 3 are cross section have been added to simplify understanding of the present invention. The cross sections illustrate the same embodiment as in FIG. 1, and the same reference numerals have been used. From these drawings the extension of the socket 118 and how it relates to other components is more obvious.

Several beneficial features are obvious from observing the appended drawings. One is that each force generated within the form and sealing unit will result in a counterforce within the form and sealing unit, and in this way the forces will balance out before reaching surrounding equipment, which has been discussed. This also facilitates the suspension and use of the device, e.g. in a filling machine. The suspension is also facilitated by the non-complex design of the device. A circular opening in a plate is suffices in order to mount the device, and no extra room for movable parts has to be arranged within the constraints of that circular opening. It is very easy to shift the device up and down, and such a shift does not alter the movement pattern of the sealing jaws etc, and the device may also be turned in the circular opening for fine tuning of its position. This also simplifies maintenance, firstly since it is easy to separate the cam arrangement and the motor from the active portion of the device, secondly since the device may be disassembled and reassembled without it affecting the operation of the device. It would also be possible, if desired, to calibrate the sealing jaws without having the arrangement mounted in a filling machine.

In use it is common to utilize the forming and sealing unit to operate at two or more packaging containers simultaneously. In such a case the sealing jaw 104 may be divided cross its longitudinal direction such that it comprises two or more segments. This may be utilized in such a way that each packaging container being formed and sealed using the inventive system will be handled by an individual segment. In this way one segment will not be affected if there is an anomaly at the other segment. Examples of anomalies include the absence of a packaging container, an unexpected thickness of the material, etc.

According to a second aspect the present invention relates to a floating dolly system for facilitating setting appropriate sealing gap between sealing jaws. The floating dolly system refers to a suspension which is advantageously used in combination with the present invention, yet I may also be used on other systems.

To this end the present aspect of the invention, according to the embodiment disclosed in FIG. 6, refers to a floating dolly system, comprising a sealing jaw 104 in the distal end, attached to a spring housing 146 via a rubber bushing 152 and a jaw piston 154, running through the rubber bushing 152, proximally of the sealing jaw 104. The spring housing 146 encloses a main spring 147, which is stressed inside the spring housing 146. Proximally, the spring housing 146 is attached to the servomotor (not shown) driven arm 108 by a shoe 160. According to the present aspect the embodiment also comprises a further spring means 151 mainly used for calibration purposes. A coil spring 149 arranged in the further spring means is configured to try to bias the jaw 104 beyond the position in which it abuts its opposing jaw 102 when the cylinder 146 is released from its shoe 160, such that an actual biasing force will be applied. The further spring means 151 may be provided with a disc springs instead of the coil spring 149, yet any other suitable biasing arrangements may be applied.

In the embodiment of FIGS. 1 (and 5 and 6) the relationship between effective spring constants may be a 1:2 ratio (spring 149 compared to the main spring 147) yet this does not have to be true in order for the embodiment to operate properly. In most cases, however, it is preferred that the relationship that the effective spring constant of the first spring (main spring) exceeds the spring constant of the second spring still prevails.

The present configuration enables a simple calibration procedure, exemplified in the following. In the embodiment of FIGS. 5 and 6 (and 1 and 4) a method of calibrating the sealing jaws by means of the suspension may comprise the steps of Loosen screw 144, which will allow the main spring cylinder 146 to slide in its socket.

Set cam in sealing position with a shim or one layer of carton between sealing jaw and the dolly.

Loosen screw 148 which will allow the further spring means 151 and its spring 149 to bias the sealing jaw in a closing direction with a force determined by the properties of the coil spring 149.

Tighten screw 144, such as to lock the main spring cylinder 146 in its socket.

Tighten screw 148, which will retract the further spring means 151 such that its biasing effect is discontinued.

In more general terms, and describing common features of both embodiments, a method for calibrating the distance between opposing sealing jaws then may comprise the following steps, which do not necessarily have to be conducted in the stated order:

Bringing the opposing sealing jaws to a fully closed position,

Disengaging the first spring arrangement such that the sealing jaws are biased towards each other by means of a force provided by a second spring arrangement only, Engaging the first spring arrangement.

The disengagement/engagement of the first spring arrangement may preferably be effected by disengaging/engaging its coupling to the socket.

This method may also comprise the steps of engaging and disengaging the second spring arrangement, wherein the step of disengaging the second spring arrangement is effected after the step of engaging the first spring arrangement. "Engaging" the second spring arrangement implies that the second spring arrangement effectively acts on the first sealing jaw to force the sealing jaws towards each other and "disengaging" implies that it does not. These additional steps may be conducted in a situation where the second spring arrangement should be prevented from interacting during the actual working cycle of the forming/sealing unit utilizing the floating dolly.

The method may also comprise, with or without the above mentioned additional steps, the step of arranging a calibration piece between the sealing jaws. The calibration piece may comprise a piece of sheet material with the desired thickness such as a piece of sheet metal or a piece of folded or non-folded packaging material. The desired thickness may preferably be smaller than the thickness of the material being arranged between the sealing jaws during actual operation.

The floating dolly system may be utilized on the form and sealing unit according to any embodiment previously described, yet it may also be used as standalone construction which may be applied to a sealing and/or forming unit utilizing sealing jaws in general.

The invention claimed is:

1. Sealing unit for sealing and forming an open end of a packaging container, comprising a pair of sealing jaws arranged on a pair of tongs controlled by a first and a second cam arrangement each comprising:

a cam track, a cam follower and a rigid power-transfer arrangement, wherein both cam tracks are arranged on a single cam wheel and arranged to move the first and second cam followers in opposite directions, a servomotor is arranged to drive the cam wheel intermittently between an open position, for the sealing jaws, and a closed position, for the sealing jaws.

2. The sealing unit of claim 1, wherein each of the two sealing jaws is arranged on a proximal end of the tong having a first pivot point at its distal end, the distance between the first pivot points of the first and the second tongs being constant.

3. The sealing unit of claim 2, wherein each of the two tongs share a common first pivot point in the form of a first pivot axis, and wherein the pivot axis is rigidly coupled to the first cam arrangement.

4. The sealing unit of claim 1, wherein the second cam arrangement extends to a second pivot axis from which two links extend, each link coupling to one tong in a coupling point being located between the distal end and the proximal end, such that relative movement between the first and the second pivot axis results in alteration of an inclination of the links and pivotal movement of the tongs in an opening or closing direction.

5. The sealing unit of claim 1, wherein the first cam follower connects to the first pivot point via a first axle, the second cam follower connects to the second pivot point via a second axle, wherein the first and the second axle extends along the same axis.

6. The sealing unit of claim 5, wherein the second axle is arranged inside the first axle, said second axle comprising a hollow cylinder.

7. The sealing unit of claim 1, wherein movement of the second cam follower controls a vertical position of the tongs and jaws, and wherein movement of the first cam follower relative to the second cam follower controls the pivotal position of the tongs.

8. The sealing unit of claim 1, wherein the first and second cam follower connects to the first and second axle via a first and second shaft, the first and second shaft extending past a connection point between the first and second axle and the first and second shaft, and wherein the end of each shaft remote to each cam follower comprises a guide means.

9. The sealing unit of claim 1 wherein the second sealing jaw is divided in a length direction such that it comprises at least two separate segments.

10. The sealing unit of claim 8, wherein the second cam follower is biased to one side of the second cam track.

11. The sealing unit of claim 1, wherein at least one sealing jaw is connected to a socket via a suspension, the suspension comprising a first spring arrangement and a second spring arrangement for biasing the sealing jaw in a biasing direction, wherein the first spring arrangement has a state in which it is rigidly attached to the socket and a state in which it is movably attached to the socket.

12. A method for calibrating the sealing unit of claim 1, comprising the steps of:
rotating the cam wheel to a position in which the sealing jaws assumes a fully closed position,
locking the position of the cam wheel,
disengaging the first spring arrangement such that the sealing jaws are biased towards each other by means of a force provided by a second spring arrangement only,
engaging the first spring arrangement,
disengaging the second spring arrangement.

* * * * *